United States Patent van Beek et al.

[11] Patent Number: 6,047,088
[45] Date of Patent: Apr. 4, 2000

[54] 2D MESH GEOMETRY AND MOTION VECTOR COMPRESSION

[75] Inventors: Petrus J. L. van Beek; Ahmet Murat Tekalp, both of Rochester, N.Y.

[73] Assignee: Sharp Laboratories of America, Inc., Camas, Wash.

[21] Appl. No.: 08/942,313

[22] Filed: Oct. 1, 1997

Related U.S. Application Data

[60] Provisional application No. 60/033,011, Dec. 16, 1996.

[51] Int. Cl.⁷ .................................. G06K 9/36; G06K 9/46
[52] U.S. Cl. .................................... 382/243; 382/236
[58] Field of Search .................... 382/232, 236, 382/244, 243, 253, 233, 238

[56] References Cited

U.S. PATENT DOCUMENTS

| | | | |
|---|---|---|---|
| 5,617,322 | 4/1997 | Yokota | 364/468.04 |
| 5,654,771 | 8/1997 | Tekalp et al. | 348/699 |
| 5,731,840 | 3/1998 | Kikuchi et al. | 348/416 |
| 5,736,991 | 4/1998 | Tada | 345/474 |
| 5,748,789 | 5/1998 | Lee et al. | 382/243 |
| 5,778,192 | 7/1998 | Schuster et al. | 395/200.77 |
| 5,825,369 | 10/1998 | Rossignac et al. | 345/440 |

*Primary Examiner*—Phuoc Tran
*Attorney, Agent, or Firm*—Robert D. Varitz, P.C.

[57] ABSTRACT

A system and method of encoding and decoding a dynamic mesh includes encoding and decoding a mesh geometry of a set of node points and encoding and decoding a mesh node motion vector for each node point.

19 Claims, 5 Drawing Sheets

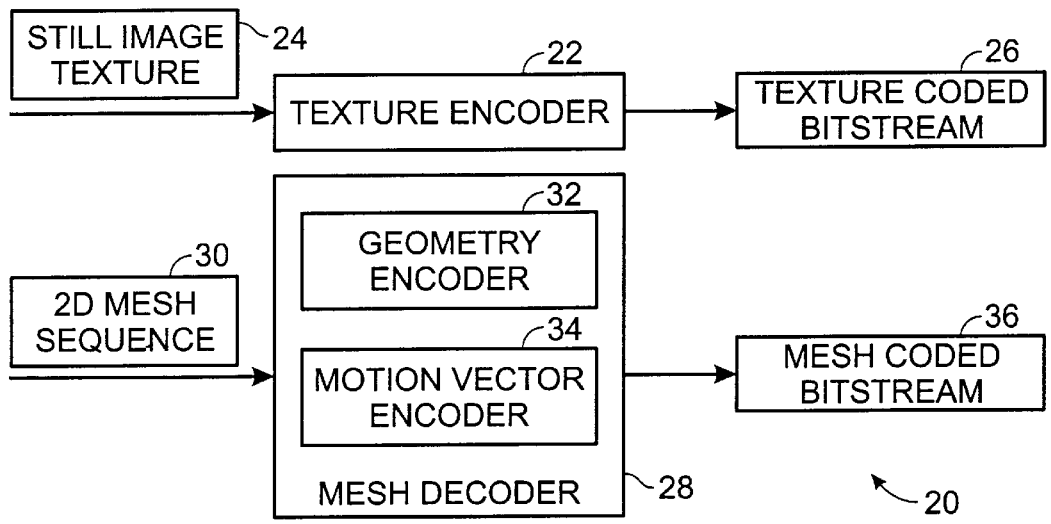
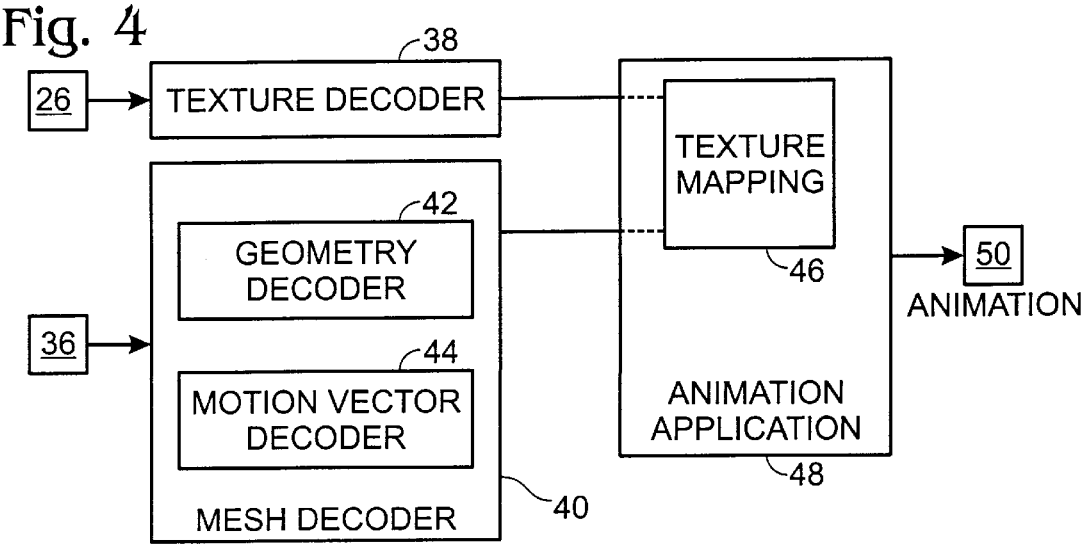

2D MESH GEOMETRY AND MOTION VECTOR COMPRESSION

This application claims benefit of U.S. provisional application 60/033,011 filed Dec. 16, 1996.

RELATED APPLICATION

U.S. Patent Application Ser. No. 08/447,418, filed May 23, 1995 for: "Video Compression System Using a Dense Motion Vector Field and a Triangular Patch Mesh Overlay Model", now U.S. Pat. No. 5,654,771, granted Aug. 5, 1997; U.S. Provisional Patent Application Ser. No. 60/010,076", filed Jan. 16, 1996 for "Video Coding and Decoding System"; and U.S. Provisional Patent Application Serial No. 60/021,093, filed Jul. 7. 1996, for "Object-Based Video Processing Using Forward Tracking 2-D Mesh Layers."

FIELD OF THE INVENTION

This invention is in the field of coding and manipulation of images, and specifically, the coding of sequences of 2D meshes, generally corresponding to a sequence of images.

BACKGROUND OF THE INVENTION

A 2D triangular mesh refers to a tessellation of a 2D visual object plane into triangular patches. The vertices of the triangular patches are called "node points." The straight-line segments joining the node points are called "edges."

A dynamic 2D mesh consists of a temporal sequence of 2D triangular meshes, where each mesh has the same topology (i.e., structure), but node positions may differ from one mesh to the next. Thus, a dynamic 2D mesh may be defined by the geometry of the initial 2D mesh and motion vectors at the node points for subsequent meshes, where each motion vector points from a node point of the previous mesh in the sequence to a node point of the current mesh. The dynamic 2D mesh may be used to create 2D animations by mapping texture from a still image onto successive 2D meshes via well-known texture mapping methods. For example, the dynamic mesh may be used to render a waving flag from a still image of a flag. The local deformations of the texture in time are captured by the motion of mesh nodes from one mesh to the next. Hence, different animations of the same texture may be achieved by different sets of node motion vectors.

Texture mapping utilizes the structure of the mesh, i.e., the way the nodes of the mesh are connected with each other, namely the configuration of the edges of the mesh. A mesh may have a specified implicit structure, such as uniform structure or Delaunay structure, as described in S. M. Omohundro, "The Delaunay triangulation and function learning," International Computer Science Institute Technical Report TR-90-001, University of California Berkeley, January 1990.

Efficient coding of an animation sequence may be achieved by separately coding the still image texture, and the associated 2D mesh, i.e., the geometry and node vectors. The associated 2D mesh is represented by the geometry of the first mesh and motion vectors of the nodes of this first and subsequent meshes. The 2D mesh is encoded by coding the geometry of the first mesh and motion vectors of the nodes of this first and subsequent meshes.

The mesh geometry compression technique described here is limited to 2D triangular meshes with implicit topology, specifically meshes with uniform and Delaunay topology. In these cases, the mesh topology is defined implicitly, given the locations of the mesh nodes (also called vertices) and some additional information to be specified in detail later. Algorithms to implement Delaunay triangulations are available in literature and are not described here. It should be noted that Delaunay triangulations are uniquely defined except if the nodes to be triangulated contain certain degeneracies in their locations. Here, it is assumed that both the mesh encoder and decoder use an agreed upon technique to handle such degeneracies. Such techniques are well known to those of skill in the art. The mesh geometry compression technique described here allows a high compression ratio for these constrained classes of meshes.

Representing mesh motion efficiently is important for describing mesh-based animations. Here, we describe a technique for compression of mesh motion in the 2D case, although it should be noted that the principle may be extended to the case of 3D meshes with 3D motion straightforwardly. Furthermore, it should be noted that the mesh motion compression technique described here is directly applicable to meshes with general topology, although the examples provided herein describe meshes with constrained topology. Finally, it should be noted that the principles of the invention with respect to motion coding may also be applied to the coding of surface appearance attributes straightforwardly.

The coding methods described here may for instance be employed in the context of MPEG-4. MPEG-4 is an object-based multimedia compression standard being developed by the Motion Picture Experts Group, which allows for encoding of different audio-visual objects (AVO) in the scene separately, as an extension of the previous MPEG-½ standards. These AVO are decoded and then composited at the user terminal according to a transmitted scene description script and/or user interaction to form display frames. The visual objects may have natural or synthetic content, including audio, video, 3D graphics models, scrolling text and graphics overlay, and so on.

SUMMARY OF THE INVENTION

This invention comprises methods for encoding the mesh data into a compressed format and methods for decoding the compressed format. The use of a compressed format facilitates efficient storage and communication of the mesh data. The coding methods described are lossless, i.e. the compressed format represents the same information contained in the original mesh data. At the same time, use of the compressed format reduces the amount of storage space or communication bandwidth required.

The inventions includes system method of encoding and decoding a dynamic mesh, including encoding and decoding a mesh geometry of a set of node points; and encoding and decoding a mesh node motion vector for each node point.

An object of the invention is to provide a system and method for encoding and decoding the mesh and displacement of the node points from one frame time instant to the next.

BRIEF DESCRIPTION OF THE DRAWINGS

FIG. 3 depicts a typical encoder/decoder system.

FIG. 4 depicts an animation application being processes by the system of FIG. 3.

DETAILED DESCRIPTION OF THE PREFERRED EMBODIMENT

Mesh-Based Motion Modeling for Video Processing

Modeling and estimating the motion of objects in a sequence of image frames is common in video processing and has a variety of applications. A common approach is block-based motion modeling, where motion parameters are estimated for each square block of pixels independently. Specifically, the translational block motion model has proven satisfactory for video compression; and has been adopted in international standards such as MPEG-1, -2 and -4. Recently, 2D mesh-based motion modeling has been proposed as a promising alternative in video processing to block-based motion modeling.

Figure 1:
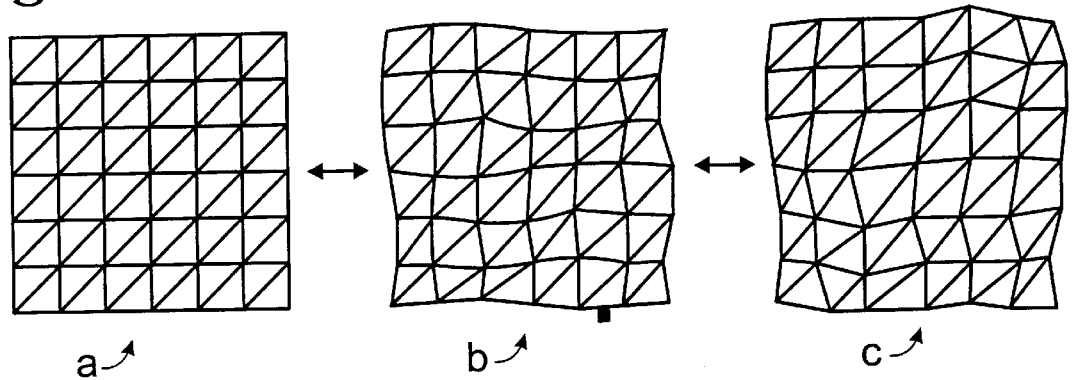
FIG. 1 depicts a mesh-based motion modeling using a triangular mesh.

A 2D mesh is a tessellation (or partition) of a 2D planar region into polygonal patches. In the following, the vertices of the polygonal patches are referred to as the node points of the mesh. The patches are usually triangles or quadrangles, leading to triangular or quadrilateral meshes, respectively. See FIG. 1a. In 2D mesh-based motion modeling, a 2D mesh is associated with an image or a set of images, such that the polygonal mesh patches correspond to patches of texture in the images, where the texture consists of the image pixels inside a patch. Polygonal patches in a reference frame are deformed by the movements of the node points into polygonal patches in another frame, and the texture inside each patch in the reference frame is warped onto the other frame using a parametric mapping as a function of the node point motion vectors. See FIGS. 1b and 1c. For triangular meshes, affine mapping is used, which may model translation, rotation, scaling and shear. Note that, in mesh-based motion modeling, the patches do not overlap in the reference frame or in the current frame. As used herein, a statement that two triangles are adjacent means that they share a common edge.

Assuming that proper constraints are imposed in the parameter estimation, an affine transform can guarantee the continuity of the mapping across the boundaries of adjacent triangles. This implies that the original 2D motion field may be compactly represented by the motion of the node points, from which a continuous, piece-wise affine motion field can be reconstructed.

3D polygon meshes have long been used for efficient 3D object geometry modeling and rendering in computer graphics. Equations similar to parametric mappings used in mesh-based motion modeling have also been used in 3D graphics to perform texture mapping, a popular procedure to render natural images on polygon meshes describing graphic objects for photo-realistic synthesized images. Texture mapping in 3D graphics is realized by assigning a texture coordinate (a pixel position on a 2D image) to every 3D node point on the polygonal mesh. Thus, each polygonal surface element on the 3D mesh is associated with a patch of the 2D image, which is then rendered on the polygon mesh subject to proper warping transformation. An animation may be created by rendering the same image onto a deforming mesh repeatedly. A similar process may be performed with 2D meshes to render an animated image sequence from an image and corresponding deforming meshes.

Motion Estimation for Mesh-Based Video Processing

Determining the motion of 2D meshes from a given image sequence is performed by estimating the motion of mesh node points over time. In the case of 2D mesh-based motion modeling, motion estimation refers to searching in a given reference image for the best locations of the node points, such that the triangular image patches in the reference frame optimally match those in the current image. The mesh in the initial reference image may have a regular structure, in which case it is called a uniform mesh, or it may be adapted to the image, in which case it is called a content-based mesh. A description of an algorithm for content-based (adaptive) mesh design may be found in the literature.

Various techniques have been proposed for node motion vector search from one frame to the next. The simplest method is to form blocks that are centered around the node points and then use a gradient-based technique or block-matching to find motion vectors at the location of the nodes. Hexagonal matching and closed-form matching techniques find the optimal motion vector at each node under the parametric warping of all patches surrounding the node while enforcing mesh connectivity constraints. Another method is iterative gradient-based optimization of node point locations, taking into account image features and mesh deformation criteria.

Figure 2:
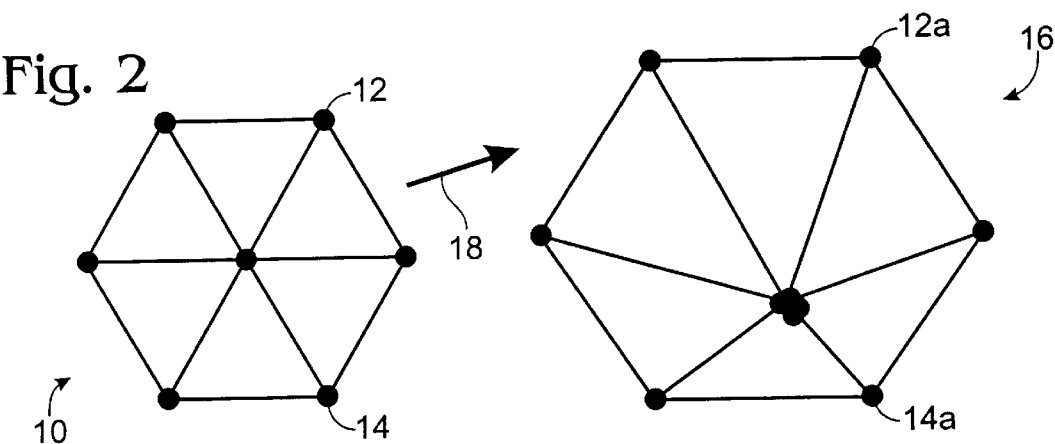
FIG. 2 depicts node motion and deformation of an image object when a mesh is imposed thereover.

Referring now to FIG. 2, an image object 10 is depicted. The motion of nodes, such as nodes 12, 14, from an image object 10 is described as the image object is transformed into an animated image object 16, having nodes 12a, 14a. The motion of nodes describe local motion and deformation of image object 10 over which a mesh 18 is imposed. The transformation that takes the mesh of object 16 to image object 10 results in local motion and deformation as well as a scaling of the entire image object.

As previously noted an object of this invention is to provide a method for encoding and decoding the mesh and displacement of the node points from one frame time instant to the next. The texture to be animated may be encoded using a still image coding method, such as those used in MPEG-4 (Moving Picture Experts Group Standard 4). The texture to be animated may be a still image of a natural object or it may be a synthetic (computer generated) image.

The application at the decoder decodes the texture and the mesh and renders the animation. The current version of MPEG-4 Systems Working Draft (WD) specify a framework for applications that support animation, MPEG-4 Systems Working Draft V 5.0 of ISO/IEC 14496, Document No. N1825, Jul. 1997, hereinafter MPEG-4 WD V 5.0).

2D Mesh Encoder

Initially, the encoding of the mesh geometry and then encoding of mesh motion vectors will be described. Assume that the mesh structure (i.e., topology) is known and is either a uniform mesh or a Delaunay mesh.

Referring to FIGS. 3 and 4, a typical system that may use the method of the invention is depicted, and includes an encoder subsystem, 20, shown in FIG. 3. Subsystem 20 includes a texture encoder 22, which receives still image texture data, 24, and generates a texture coded bit stream, 26. A mesh encoder 28 receives a 2D mesh sequence 30. Encoder 28 includes a geometry encoder 32 and a motion vector encoder 34. Encoder 28 generates a mesh coded bit stream 36.

The decoding subsystem 20 is shown in FIG. 4, and includes a texture decoder 38 and a mesh decoder 40. Mesh decoder 40 includes a geometry decoder 42 and a motion vector decoder 44. Output from texture decoder 38 and mesh decoder 40 results in texture mapping data 46, which is used in an animation application 48, resulting in an animated image 50. It will be appreciated by those of skill in the art that while the preferred embodiment of the system of the invention is described as manipulating a still image, other images, such as video images, may also be manipulated.

Mesh Geometry Encoding

Because the initial 2D triangular mesh is either a uniform mesh or a Delaunay mesh, the mesh triangular topology (links between node points) is not encoded; only the 2D node point coordinates $\vec{p}_n=(x_n, y_n)$ are encoded. In the bit stream, a special flag may specify whether the initial mesh is uniform or Delaunay. See Table 8, below.

Figure 5:
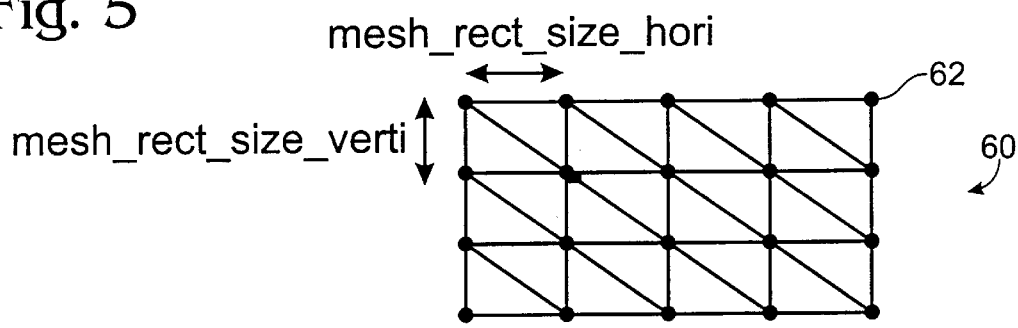
FIG. 5 depicts a generalized uniform 2D mesh.
Figure 6:
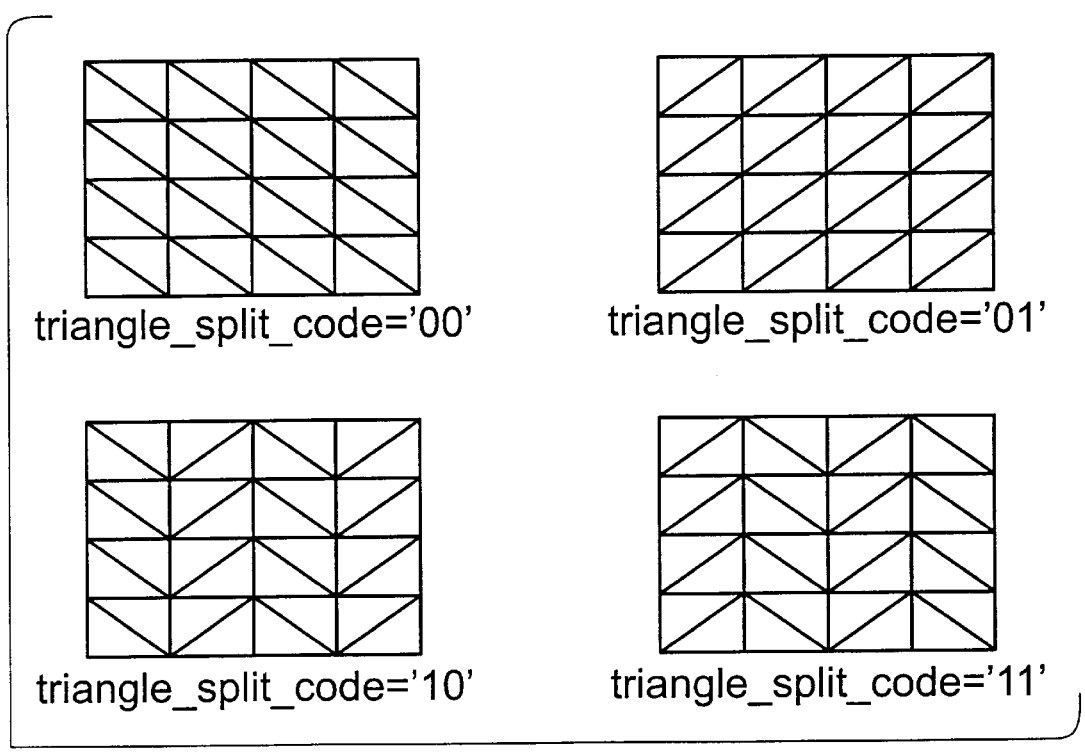
FIG. 6 depicts four types of uniform meshes.

In case of a uniform mesh, five parameters, nr_of_mesh_nodes_hori, nr_or_mesh_nodes_verti, mesh_rect_size_hori, mesh_rech_size_verti, and triangle_split_code, (further defined and described in Table 5, below) are used to specify the complete topology and node point locations. An example of a 2D uniform mesh is shown in FIG. 5, generally at 60, wherein the number of nodes 62, shown as dark circles for emphasis, in the horizontal and vertical dimensions are equal to 5 and 4, respectively. The splitting of rectangles into triangles may be done in four different schemes, as shown in FIG. 6. One of these types is shown in FIG. 5, which corresponds to triangle_split_code='00'. Other codes are further defined in Table 9. The first two parameters, nr_of_mesh_nodes_hori, nr_or_mesh_nodes_verti, specify the number of nodes in the horizontal and vertical direction, respectively, of the uniform mesh. The next two parameters, mesh_rect_size_hori, mesh_rect_size_verti, specify the horizontal, and vertical size of each rectangle (containing two triangles) in half pixel units, respectively. This specifies the layout and dimensions of the mesh. The last parameter, triangle_split_code, specifies how each rectangle is split to form two triangles.

Delaunay mesh

The node point coordinates are encoded, by first encoding the boundary node points and then the interior node points of the mesh. To encode the interior node positions, the nodes are traversed one by one using a nearest neighbor strategy and each node position is encoded differentially using the position of the previously encoded node as a predictor. A linear ordering of the node points is computed such that each node is visited once. When a node is visited, its position is differentially encoded with respect to the previously encoded node. That is, the difference between the position of the present node and the reconstructed value of the previous node is encoded using variable length coding (VLC). The ordering is such that the boundary nodes are visited first; then the interior nodes. By sending the total number of node points and the number of boundary node points, the decoder knows how many node points will follow, and how many of those are boundary nodes; thus it is able to reconstruct the polygonal boundary and the locations of all nodes.

Figure 7:
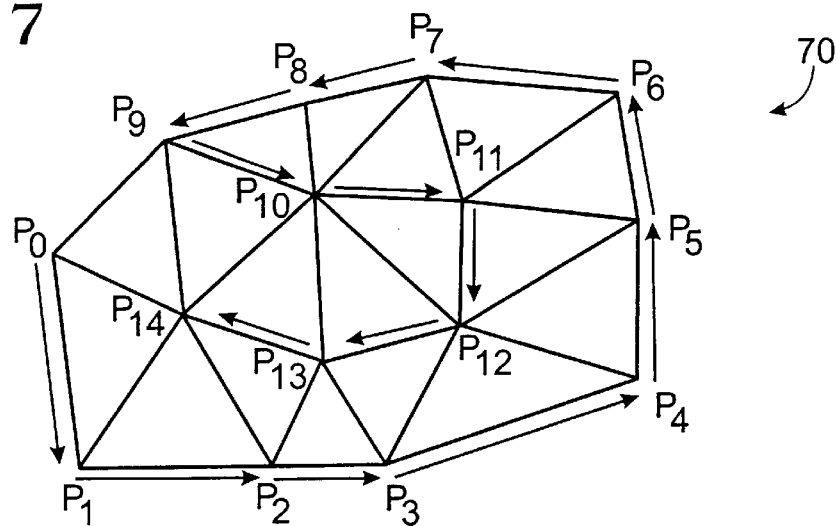
FIG. 7 depicts a node point ordering in a 2D triangular mesh of the Delaunay type.

This procedure is illustrated in FIG. 7, which is an example of a small triangular mesh, 70. FIG. 7 depicts a traversal of node points of a 2D triangular mesh and ordering of the node points to be coded. First, the boundary nodes, $p_0 \ldots p_9$, are visited according to connectivity, i.e., the next node is always the next connected node on the boundary in the counterclockwise direction. Then, the interior nodes, $p_{10} \ldots p_{14}$, are visited according to proximity, i.e., the next node is always the nearest node that is not already encoded. The total number of nodes and the number of boundary nodes is encoded. The top-left node $\vec{p}_0$ is encoded without prediction, where the top left node $\vec{p}_0=(x_0, y_0)$ is defined as the node n with minimum $x_n+y_n$, assuming the origin of the local coordinate system is at the top left. If there is more than one point with the same value of $x_n+y_n$, then choose the node point with minimum y. Then, the next counterclockwise boundary node $\vec{p}_1$ is found and the difference between $\vec{p}_0$ and $\vec{p}_1$ is encoded; then all other boundary nodes are encoded in a similar fashion. Then, the not previously encoded interior node that is nearest to the last boundary node is found and the difference between these is encoded. That node is defined as the not already encoded node n with minimum $|x_n-x_{last}|+|y_n-y_{last}|$, where $(x_{last}, y_{last})$ represent the coordinates of the previously encoded node. Then, the not previously encoded node nearest to the last encoded node is found and the difference is encoded, and so on.

Every node point has an x- and y-coordinate, $\vec{p}_n=(x_n, y_n)$, each of which is subtracted from the corresponding coordinate of the previously encoded node point. The two resulting difference values are encoded using variable length coding (VLC). In a particular embodiment of the current invention, variable length codes specified by MPEG-4 for coding sprite trajectories are used. In principle, specific variable length codes may be designed.

Encoding of Node Motion Vectors

Each node point $\vec{p}_n$ of a 2D mesh numbered k in the sequence of meshes has a 2D motion vector $\vec{v}_n$, defined from mesh k to k+1. The locations of node points $\vec{p}_n{}'$ of the mesh numbered k+1 are encoded by encoding all motion vectors $\vec{v}_n$, n=0, . . . , N−1. Note that the triangular topology of the mesh remains the same throughout the sequence.

Two alternative methods for node motion vector coding will be described, both of which incorporate predictive coding of the node motion vectors. Predictive coding of motion vectors entails prediction of each motion vector by one or more already encoded motion vector(s) of other node points in the mesh; subsequently the difference between the predicted vector and actual motion vector is encoded instead of the original. The first method, Method I, uses only one already encoded motion vector to predict the value of a particular motion vector. The second method, Method II, uses two already encoded motion vectors to predict the value of a particular motion vector. The methods also differ with respect to the choice of predicting motion vectors; in Method I the predicting motion vector is defined as the preceding motion vector in a simple node point ordering; in Method II the predicting motion vectors are defined by the use of a breadth-first traversal of the mesh. Note that the bit stream syntax for mesh motion coding, as defined in Table 6, is the same for Method I and II.

Method I

Assume there is a unique ordering of the available node points $\vec{p}_n$, where n denotes the ordering number. In the case where the mesh is a Delaunay-type mesh, as shown in FIG. 7, the ordering is simply defined as the order in which the node point locations are encoded during mesh geometry encoding; i.e., the node point for which the location is encoded first is $\vec{p}_0$, the node point for which the location is encoded after that is $\vec{p}_1$, etc. The ordering used during mesh geometry encoding is based on a traversal of the initial mesh, where boundary nodes are visited first, then interior nodes are visited, as previously described.

Figure 8:
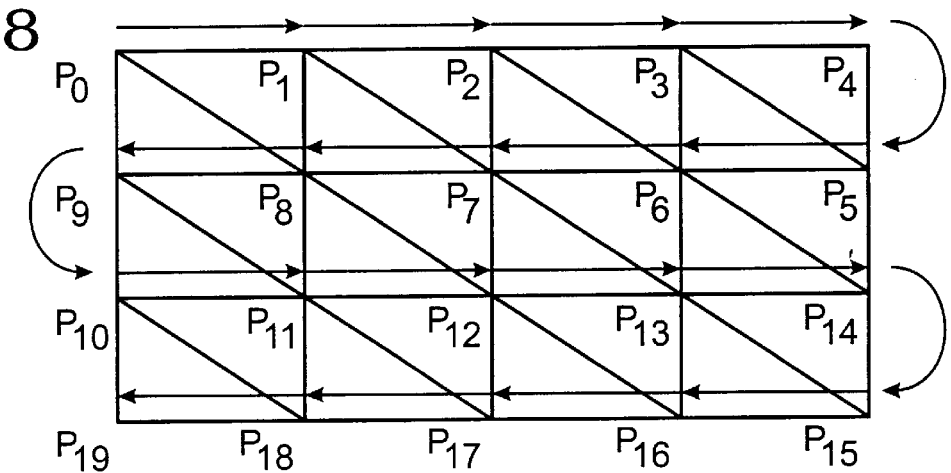
FIG. 8 depicts node point ordering in a 2D triangular mesh of the uniform type.

In the case where the mesh is a uniform-type mesh, as shown in FIG. 8, the node ordering is defined on the basis of the mesh structure as follows. The first node point in the ordering, $\vec{p}_0$, is the most top-left node point of the uniform mesh; the following node points in the ordering are obtained by traversing the node points of the uniform mesh from left to right in the first (top) row of node points; going to the node in the second row of nodes immediately below the last node of the first row; traversing the second row from right to left; going down to the third row of nodes and traversing the third row from left to right, etc. This ordering is defined by a simple traversal of the uniform mesh.

For each node point in the mesh, a one bit flag, the node_motion_vector_flag, is encoded to specify whether that node point has a non-zero motion vector. For each node point in the mesh with non-zero motion vector, a motion vector difference vector $\vec{e}_n$ is encoded to specify the difference between the motion vector of that node and the previously encoded motion vector.

Thus, the encoding process is as follows: The motion vectors of all node points $\vec{p}_n$, n=0, ..., N−1, are defined by:

$$\vec{v}_n = \vec{p}_n' - \vec{p}_n. \quad (1)$$

If the first node point in the ordering defined above has a zero motion vector, i.e. $\vec{v}_0=(0,0)$, no motion vector data is encoded for this node point. If the first node point has a non-zero motion vector, then a vector $\vec{e}_0$ is defined, equal to the motion vector of the first node point:

$$\vec{e}_0 = \vec{v}_0. \quad (2)$$

The vector $\vec{e}_0$ is encoded by VLC of its x- and y-component. For all other node points in the ordering as defined above, the encoding process is as follows:

If node point $\vec{p}_n$, n=1, ..., N−1, has a zero motion vector, i.e. $\vec{v}_n=(0,0)$, then no motion vector data is encoded for that node point. Otherwise, a motion vector difference vector $\vec{e}_n$ is computed from the previously encoded motion vector and the current motion vector by:

$$\vec{e}_n = \vec{v}_n - \vec{v}_{n-1}, \quad (3)$$

Then, the vector $\vec{e}_n$ is encoded by variable length encoding of its x- and y-component. Thus, to encode the actual motion vectors, difference vectors $\vec{e}_n$ are encoded one by one in the order specified above.

Method II: Motion Vector Prediction

Method II is based on a predictive coding technique where two motion vectors are used to compute a predictor. The predictive coding technique of Method II specifically employs the following technique of motion vector prediction. To encode the motion vector of a node point $\vec{p}_n$ that is part of a triangle $t_k = <\vec{p}_1, \vec{p}_m, \vec{p}_n>$, where the two motion vectors vectors $\vec{v}_1$ and $\vec{v}_m$ of the nodes $\vec{p}_1$ and $\vec{p}_m$ have already been encoded, one may use the values of $\vec{v}_1$ and $\vec{v}_m$ to predict $\vec{v}_n$ and encode the prediction error value. Starting from an initial triangle $t_k$, for which all three node motion vectors have been encoded, there must be at least one other, neighboring, triangle $t_w$ that has two nodes in common with $t_k$. Because the motion vectors of the two nodes that $t_k$ and $t_w$ have in common have already been encoded, one may use these two motion vectors to predict the motion vector of the third node in $t_w$. The actual prediction vector $\vec{w}_n$ is computed by averaging of the two prediction motion vectors and the components of the prediction vector are rounded to half-pixel accuracy, as follows:

$$\vec{w}_n = 0.5 \times (\lfloor \vec{v}_m + \vec{v}_1 + 0.5 \rfloor) \quad (4)$$

This prediction formula is used for all motion vectors, except for the first and second motion vectors encoded. When encoding the first motion vector, the prediction vector is set to the zero vector:

$$\vec{w}_{n_0} = (0,0). \quad (5)$$

When encoding the second motion vector, the prediction vector is set to the first encoded motion vector:

$$\vec{w}_{n_1} = \vec{v}_{n_0} \quad (6)$$

For each node point n, a prediction error vector, $\vec{e}_n$, is computed by taking the difference between the prediction vector and the actual motion vector:

$$\vec{p}_n = \vec{v} \text{ hd } n - \vec{w}_n. \quad (7)$$

Each prediction error vector is encoded using variable length encoding. This procedure is repeated while traversing the triangles and nodes of the mesh, as explained below. Note that the prediction error vector is encoded only for node points with a non-zero motion vector. For all other node points, the motion vector is simply $\vec{v}_n=(0,0)$. The previously identified node_motion_vector_flag is used to specify whether a node has a non-zero motion vector or not.

Method II: Mesh Traversal

A breadth-first traversal is used to visit all the triangles and nodes in the mesh numbered k, and to encode the motion vectors defined from mesh k to k+1. The breadth-first traversal is a uniquely defined traversal of the mesh such that every triangle is visited exactly once and each node is visited at least once. Because this traversal is determined by the topology of the mesh, which is known at the encoder at all times and known at the decoder once the initial mesh has been decoded, the traversal of the mesh may be performed at both the encoder and decoder in exactly the same manner.

Figure 9:
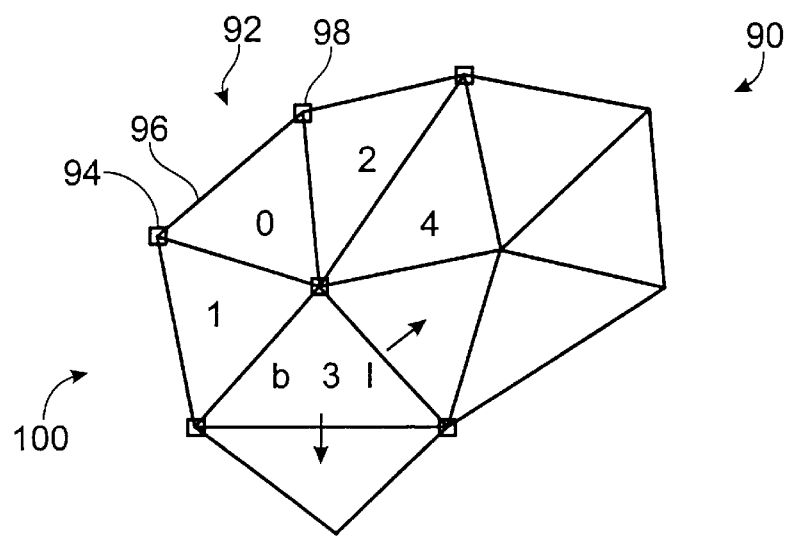
FIG. 9 depicts a halfway-point in a breadth-first traversal of a 2D triangular mesh.

The breadth-first traversal of the mesh triangles is defined as follows and is illustrated in FIG. 9, generally at 90. First, define an initial triangle 92 as follows: Define the top left mesh node 94 as the node n with minimum $x_n+y_n$, assuming the origin of the local coordinate system is at the top left. If there is more than one node with the same value of $x_n+y_n$, then choose the node point among these with minimum y. The edge 96 between the top-left node of the mesh and the next clockwise node 98 on the boundary is an edge of the triangle that is designated as the initial triangle. Label the initial triangle with the number 0.

Second, all other triangles are iteratively labeled with numbers 1, 2, . . . , M—1, where M is the number of triangles in the mesh. Among all labeled triangles that have adjacent triangles which are not yet labeled, find the triangle with the lowest number label. This triangle is referred to in the following as the current triangle 100. In the first iteration, the initial triangle becomes the current triangle. Define the base edge of this triangle as the edge that connects this triangle to the already labeled neighboring triangle with the lowest number. In the case of the initial triangle, the base edge is defined as the edge between the top-left node and the next clockwise node on the boundary. Define the right edge of the current triangle as the next counterclockwise edge with respect to the base edge; and define the left edge as the next clockwise edge with respect to the base edge. That is, for a triangle $t_k = <\vec{p}_1, \vec{p}_m, \vec{p}_n>$, where the vertices are in clockwise order, if $<\vec{p}_1 \vec{p}_m>$ is the base edge, then $<\vec{p}_1 \vec{p}_n>$ is the right edge and $<\vec{p}_m \vec{p}_n>$ is the left edge.

Third, determine if there is an unlabeled triangle adjacent to the current triangle, sharing the right edge. If there is such a triangle, it is labeled with the next available number. Determine if there is an unlabeled triangle adjacent to the current triangle, sharing the left edge. If there is such a triangle, it is labeled with the next available number. This process is continued iteratively until all triangles have been labeled with a unique number m. Referring now to FIG. 9, a breadth-first traversal of a 2D triangular example mesh is depicted. The traversal is halfway through the mesh—five triangles have been labeled (with numbers) and the motion vectors of six node points have been encoded (marked with a box symbol). The triangle which has been labeled '3' is the 'current triangle'; the base edge is 'b'; the right and left edge are 'r' and 'l'. The triangles that will be labeled next are the triangles sharing the right, resp. left edge with the current triangle. After those triangles are labeled, the triangle which has been labeled '4' will be the next 'current triangle' and another motion vector will be encoded The ordering of the triangles according to their assigned label numbers implicitly defines the order in which the motion vector data of each node point is encoded. Initially, motion vector data for the top-left node of the mesh is encoded. No prediction is used for the motion vector of this node, hence this data specifies the motion vector itself. Then, motion vector data for the second node, which is the next clockwise node on the boundary with respect to the top-left node, is encoded. This data contains the prediction error for the motion vector of this node, where the motion vector of the top-left node is used as a prediction. These first two nodes that form the base edge of the initial triangle are marked with the label 'done'.

During each iteration of the breadth-first traversal, as described above, and starting from the initial triangle, the motion vectors of the two nodes that are on the base edge of the current triangle during that iteration are used to form a prediction for the motion vector of the third node of that triangle. If that third node is not yet labeled 'done', prediction error values are computed by subtracting the prediction from the actual motion vector, and the motion vector data is encoded by VLC. The third node is labeled 'done'. If the third note is already labeled 'done', it is simply ignored and no data is encoded. Note that due to the nature of the traversal process, the two nodes on the base edge of a triangle are guaranteed to be labeled 'done' when that triangle becomes the 'current triangle', signifying that their motion vectors have already been encoded and may be used as predictors. Motion vectors and triangle queue states for the encoding steps of the method are shown in Table 1.

TABLE 1

| encode | triangle queue state |
|---|---|
| $v_3, v_1$ | $\{t_3\}$ |
| $v_6$ | $\{t_5, t_0\}$ |
| $v_7$ | $\{t_0, t_8\}$ |
| $v_0$ | $\{t_8, t_2\}$ |
| $v_8$ | $\{t_2, t_9, t_6\}$ |
| $v_4$ | $\{t_9, t_6, t_1\}$ |
| $v_9$ | $\{t_6, t_1\}$ |
| — | $\{t_1, t_7\}$ |
| $v_2$ | $\{t_7, t_4\}$ |
| $v_5$ | $\{t_4\}$ |
| — | $\{\}$ |

The breadth-first traversal of the triangles and the encoding of the node motion vector data may be performed simultaneously by making use of a first-in-first-out (FIFO) queue of triangles. It should be noted, however, that the following description serves as a preferred embodiment of the invention, and that implementation of the motion vector encoding process using a triangle queue is only one of several ways to implement the breadth-first traversal.

The FIFO queue is used to temporarily store triangles $t_k$, where each triangle is specified by an ordered triple of node points $t_k = <\vec{p}_1, \vec{p}_m, \vec{p}_n>$ such that the node points of the triangle are stored in clockwise order and such that the first and second node points always correspond to the base edge of a triangle.

The top-left node of the mesh and its neighboring node on the boundary, in a clockwise direction, together define the initial triangle in the traversal. The motion vectors associated with these two nodes are encoded as described above. The (initially empty) FIFO queue is now initialized by appending the initial triangle at the end. Furthermore, the initial triangle is labeled with number 0, and its two already-processed nodes are marked 'done'. Next, the FIFO queue is processed as follows until it is empty.

The ordered triple $t_k = <\vec{p}_1, \vec{p}_m, \vec{p}_n>$ that is at the head of the queue is removed from the queue. The base edge, right edge and left edge of this triangle may be identified immediately from this triple. If the third node, $\vec{p}_n$, is marked 'done', no further action is taken; otherwise, a prediction vector is computed using the already encoded motion vectors associated with the first two nodes in the triple, $\vec{p}_1$ and $\vec{p}_m$, and the actual motion vector at $\vec{p}_n$. The prediction error values are encoded by VLC. The subject node point now marked 'done'. Determine whether $t_k$ has an adjacent triangle sharing the right edge that has not yet been labeled. If there is such a triangle, it is labeled with a new number and appended to the end of the queue. Determine whether $t_k$ has an adjacent triangle sharing the left edge that has not yet been labeled. If there is such a triangle, it is labeled with a new number and appended to the end of the queue.

When all triangles have been labeled with a number, no more triangles will be appended to the queue. When the queue is empty, all triangles will have been processed and all node motion vectors will have been encoded.

Because every triangle in the mesh has at least one adjacent neighbor, and triangles are labeled when visited, every triangle is visited exactly once and the traversal terminates when (and only when) all triangles have been visited. The breadth-first traversal of triangles defines an ordering in which node points are visited. Node points may be visited more than once, but their motion vectors are encoded only at the first time a node is visited. Each node is labeled at the time of encoding, such that no attempt will be made to encode the corresponding motion vector again. The unique ordering of node points corresponds to the order of motion vector data put in the bit stream.

Figure 10:
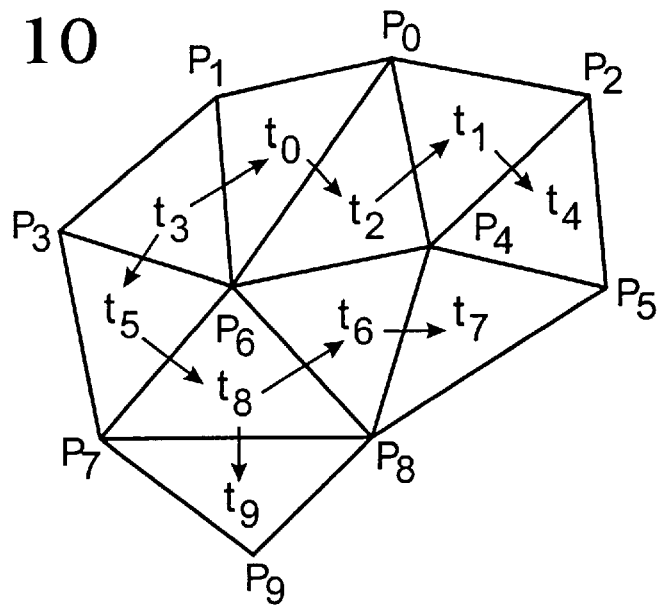
FIG. 10 depicts a breadth-first traversal of triangles in a 2D mesh.

The breadth-first traversal process is illustrated in FIG. 10 for a small triangular mesh, showing a traversal of triangles arbitrarily numbered $t_0, \ldots, t_9$ and the corresponding ordering of node points arbitrarily numbered $\vec{p}_0, \ldots, \vec{p}_9$. The initial triangle $t_k$ is defined using the top-left node $\vec{p}_3$ and the next clockwise node on the boundary $\vec{p}_1$. The motion vector $\vec{v}_3$ is encoded without using any prediction; the motion vector $\vec{v}_1$ is encoded using only $\vec{v}_3$ as a prediction. Nodes $\vec{p}_3$ and $\vec{p}_1$ are marked 'done'. The triangle queue is initialized with $t_3$ and $t_3$ is labeled. The actual breadth-first traversal of the mesh now starts by removing the front element from the queue, in this case $t_3$. The motion vector of its third node, $\vec{v}_6$, is now encoded using $\vec{v}_3$ and $\vec{v}_1$ as predictors and putting the prediction error in the bit stream. Node $\vec{p}_6$ is marked 'done'. The next step is to append any triangles adjacent to the current triangle $t_3$ and not yet labeled to the triangle queue. The triangle on the right of the current triangle (in this case $t_5$) is appended first; then the triangle on the left (in this case $t_0$); both are labeled.

The next iteration of the traversal commences by removing the front element from the queue, in this case $t_5$. The motion vector of its third node, $\vec{v}_7$, is now encoded using $\vec{v}_3$ and $\vec{v}_6$ as predictors and retrieving the prediction error from the bit stream. Node $\vec{p}_7$ is marked 'done' and the connected triangle $t_8$ is appended to the triangle queue and labeled.

Such iterations continue until the triangle queue is empty and all node motion vectors have been encoded. The steps of the algorithm are illustrated in Table 1.

2D Mesh Decoder

In reference to the MPEG-4 syntax, described later herein, and again referring to FIG. 4 and Tables 3–6, after mesh_object_start_code has been decoded by mesh decoder 40, a sequence of mesh object planes is decoded, until a mesh_object_end_code is detected. The new_mesh_flag of the mesh object plane class determines whether the data that follows specifies the initial geometry of a new dynamic mesh, in which case the data is sent to geometry decoder 42, or whether it specifies the motion of nodes from the previous mesh to the current mesh, in a sequence of meshes, in which case the data is sent to motion vector decoder 44.

In the following, the decoding of mesh geometry is described, followed by a description of the decoding of mesh motion. This description is general in nature and may be implemented using any syntax other than the MPEG-4 syntax specified herein in the preferred embodiment.

Mesh Geometry Decoding

Because the initial 2D triangular mesh is either a uniform mesh or a Delaunay mesh, the mesh triangular topology (links between node points) is not encoded; only the 2D node point coordinates $\vec{p}_n = (x_n, y_n)$ are encoded. The mesh_type_code (Table 8) specifies whether the initial mesh is uniform or Delaunay.

Uniform mesh

As previously stated, five parameters specify the geometry of a uniform mesh (Table 5). The first two decoded parameters specify the number of nodes in the horizontal and vertical, respectively, direction of the uniform mesh. The next two decoded parameters specify horizontal and vertical size of each rectangle (containing two triangles) in units accurate to half pixel units. The last parameter specifies how each rectangle is split into two triangles.

Delaunay mesh

First, the total number of node points in the mesh N is decoded; then, the number of node points that are on the boundary of the mesh $N_b$ is decoded. Note that N is the sum of the number of nodes in the interior of the mesh, $N_i$ and the number of nodes on the boundary, $N_b$, $$N = N_i + N_b. \qquad (8)$$

Then, the locations of boundary and interior node points are decoded. The origin of the local coordinate system is presumed to be at the top left of the image object.

The x-, and y-coordinates of the first node point are decoded, which is specified in half-pixel units by a fixed length code (FLC). All the other node point locations are computed by adding differential values to previously decoded node locations. In particular, a delta_x, and delta_y value is added to the x- and y-coordinate, respectively, of the previously decoded node location. The delta_x and delta_y value are each decoded by first decoding a variable length code (VLC) specifying their respective lengths, delta_x_len_vlc and delta_y_len_vlc, and then decoding their values. Thus, the coordinates of the initial node point $\vec{p}_0 = (x_0, x_0)$ is decoded as is. The coordinates of all other node points, $\vec{p}_n = (x_n, y_n)$ are determined by adding a decoded value to the previously decoded node point coordinates: $x_n = x_{n-1} + dr_n$ and $y_n = y_{n-1} + dy_n$. The differential values are decoded using variable length codes used at the encoder.

Figure 11:
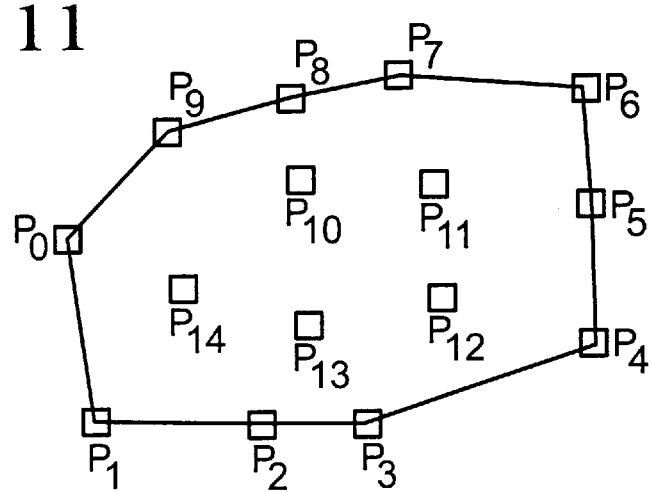
FIG. 11 depicts a set of decoded node points and mesh boundary edge segments.

The ordering in the sequence of decoded locations is such that the first $N_b$ locations correspond to boundary nodes (in counterclockwise direction). Thus, after receiving the first $N_b$ locations, the decoder is able to reconstruct the boundary of the mesh by connecting each pair of successive boundary nodes, as well as the first and the last, by straight-line edge segments. The next $N - N_b$ values in the sequence of decoded locations correspond to interior node points. Thus, after receiving N nodes, the locations of both the boundary and interior nodes may be reconstructed, in addition to the polygonal shape of the boundary. This is illustrated in FIG. 11, which depicts decoded node points (rectangles) and mesh boundary edge segments (straight lines) that are the input to the constrained Delaunay triangulation.

Figure 12:
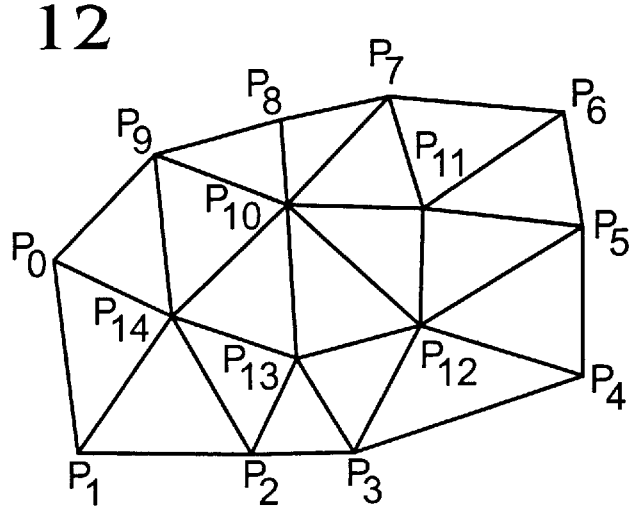
FIG. 12 depicts a decoded triangular mesh obtained by constrained Delaunay triangulation.

The mesh is finally obtained by applying constrained Delaunay triangulation to the set of decoded node points, where the edge segments on the mesh boundary are used as constraints. Delaunay triangulation proceeds by inserting an edge between two node points if there exists a circle through these two points that does not contain any other node point in its interior and does not intersect any other node point. The boundary edge segments present the only exceptions to this definition and may not be removed in the process. An example of a mesh obtained by constrained triangulation of the node points of FIG. 11 and is shown in FIG. 12.

Decoding of Node Motion Vectors

Each node point $\vec{p}_n$ of a 2D mesh numbered k in the sequence of meshes has a 2D motion vector $\vec{v}_n$, defined from mesh k to k+1. By decoding all motion vectors $\vec{v}_n$, n=0, ..., N-1, one is able to reconstruct the locations of node points $\vec{p}_n'$ of the mesh numbered k+1. Note that the triangular topology of the mesh remains the same throughout the sequence of meshes.

As previously explained in the section entitled "Encoding of Node Motion Vectors", two methods for motion coding are described. Accordingly, two methods for motion vector decoding will be described and are identified as Method I and Method II.

Method I

Method I is based on a predictive coding technique where only one motion vector is used as a predictor. A unique ordering of the node points $\vec{p}_n$ is available, where n denotes the ordering number. In the case that the mesh represents a Delaunay-type mesh, this ordering is simply defined as the order in which the node point locations are received during mesh geometry decoding. The node point for which the location was received first is $\vec{p}_0$, the node point for which the location was received after that is $\vec{p}_1$, etc. In the case where the mesh is a uniform-type mesh, the node ordering is defined on the basis of the mesh structure as previously described in the section entitled "Encoding of Node Motion Vectors: Method I." This ordering, defined by a simple traversal of the uniform mesh, is illustrated in FIG. 8.

For each node point in the mesh, a one bit flag specifies whether that node point has a non-zero motion vector. For each node point in the mesh with non-zero motion vector, a motion vector difference vector $\vec{e}_n$ specifies the difference between the motion vector of that node and the previously decoded motion vector. The decoding process is as follows:

To decode the motion vectors, vectors $\vec{e}_n$ are retrieved from the bit stream one by one, and used to compute the new locations of node points in the order specified above. If the first node point in the ordering has a zero motion vector, then:

$$\vec{v}_0 = (0,0). \tag{9}$$

If the first node point in the ordering has a non-zero motion vector, then the first vector retrieved from the bit stream, $\vec{e}_0$, and specifies the motion vector of the first node point directly:

$$\vec{v}_0 = \vec{e}_0. \tag{10}$$

The new location of the first node point is obtained by:

$$\vec{p}_0' = \vec{p}_0 = \vec{v}_0. \tag{11}$$

All other vectors retrieved from the bit stream $\vec{e}_n$ are motion vector difference vectors and are added to the previously decoded motion vector to obtain the actual motion vector. If node point $\vec{p}$ hd n, n=1, ..., N-1, has a zero motion vector, then:

$$\vec{v}_n = (0,0), \tag{12}$$

otherwise:

$$\vec{v}_a = \vec{v}_n - 1 + \vec{e}_n. \tag{13}$$

The new location of node points $\vec{p}_n$, n=1, ..., N-1, is obtained by:

$$\vec{p}_a' = \vec{p}_n + \vec{v}_a. \tag{14}$$

Method II: Motion Vector Prediction

Method II is based on a predictive coding technique where two motion vectors are used to compute a predictor. The predictive decoding technique of Method II specifically employs the following principle: To decode the motion vector of a node point $\vec{p}_n$ that is part of a triangle $t_k = <\vec{p}_1, \vec{p}_m, \vec{p}_n>$, where the two motion vectors vectors $\vec{v}_1$ and $\vec{v}_m$ of the nodes $\vec{p}_1$ and $\vec{p}_m$ have already been decoded, the values of $\vec{v}_1$ and $\vec{v}_m$ may be used to predict $V_n$ and decode the prediction error value. Starting from an initial triangle $t_k$, of which all three node motion vectors have been decoded, there must be at least one other, neighboring, triangle $t_w$ that has two nodes in common with $t_k$. Because the motion vectors of the two nodes that $t_k$ and $t_w$ have in common have already been decoded, these two motion vectors may be used to predict the motion vector of the third node in $t_w$. The actual prediction vector $\vec{w}_n$ is computed by averaging of the two prediction motion vectors and the components of the prediction vector are rounded to half-pixel accuracy, as follows $$\vec{w}_n = 0.5 \times (\lfloor \vec{v}_m + \vec{v}_1 + 0.5 \rfloor). \tag{15}$$

The motion vector itself is computed by:

$$\vec{v}_n = \vec{w}_n + \vec{e}_n. \tag{16}$$

where $\vec{e}_n$ denotes the prediction error vector, the components of which are decoded from variable length codes. This procedure is repeated while traversing the triangles and nodes of the mesh, as explained below. While visiting all triangles of the mesh, the motion vector data of each node is decoded from the bit stream one by one. Note that no prediction is used to decode the first motion vector, $$\vec{v}_{n_0} = \vec{e}_{n_0}. \tag{17}$$

and that only the first encoded motion vector is used as a predictor to encode the second motion vector, $$\vec{v}_{n_1} = \vec{v}_{n_0} \vec{e}_{n_1}. \tag{18}$$

It should be noted that the prediction error vector is specified only for node points with a non-zero motion vector. For all other node points, the motion vector is simply $\vec{v} n=(0,0)$.

Method II: Mesh Traversal

A breadth-first traversal is used to visit all the triangles and nodes in the mesh numbered k, and to decode the motion vectors defined from mesh k to k+1. The breadth-first traversal of the triangles is defined in the section on "Encoding of Node Motion Vectors: Method II," and may be applied similarly to the decoding phase.

The ordering of the triangles according to their label numbers assigned during the breadth-first traversal implicitly defines the order in which the motion vector data of each node point is decoded, as described in the following. Initially, motion vector data for the top-left node of the mesh is retrieved from the bit stream. No prediction is used for the motion vector of this node, hence this data specifies the motion vector itself. Motion vector data for the second node, which is the next clockwise node on the boundary with respect to the top-left node, is retrieved from the bit stream. This data contains the prediction error for the motion vector of this node, where the motion vector of the top-left node is used as a prediction. These first two nodes (that form the base edge of the initial triangle) are marked with the label 'done'.

During each iteration of the breadth-first traversal as described before and starting from the initial triangle, the motion vectors of the two nodes that are on the base edge of the current triangle during that iteration are used to form a prediction for the motion vector of the third node of that triangle. If that third node is not yet labeled 'done', motion vector data is retrieved from the bit stream and used as prediction error values, i.e., the decoded values are added to the prediction to obtain the actual motion vector. That third node is then labeled 'done'. If the third note is already labeled 'done', then it is simply ignored and no data is retrieved from the bit stream. Due to the nature of the traversal process, the two nodes on the base edge of a triangle are guaranteed to be labeled 'done' when that triangle becomes the 'current triangle', signifying that their motion vectors have already been decoded and may be used as predictors.

Because every triangle in the mesh has at least one adjacent neighbor, and triangles are labeled when visited, every triangle is visited exactly once and the traversal terminates when (and only when) all triangles have been visited. Node points may be visited more than once, but their motion vectors are decoded only at the first time a node is visited and each node is labeled at the time of decoding, therefore, no attempt will be made to decode the corresponding motion vector again. The unique ordering of node points corresponds to the order of motion vector data present in the bit stream.

Similar to the encoding phase, the breadth-first traversal of the triangles and the decoding of the node motion vector data may be performed simultaneously by making use of a first-in-first-out (FIFO) queue of triangles. For details, see the section on "Encoding of Node Motion Vectors," above, and FIG. 10, which illustrate the breadth-first traversal process during decoding for a small triangular mesh. FIG. 10 depicts a traversal of triangles arbitrarily numbered $p_0, \ldots, p_9$ and the corresponding ordering of node points arbitrarily numbered $t_0, \ldots, t_9$. The initial triangle, $t_3$, is defined using the top-left node $\vec{p}_3$ and the next clockwise node on the boundary $\vec{p}_1$. The motion vector $v_3$ is decoded without using any prediction. The motion vector $\vec{v}_1$ is decoded using only $\vec{v}_3$ as a prediction. Nodes $\vec{p}_3$ and $\vec{p}_1$ are marked 'done'. The triangle queue is initialized with $t_3$, and $t_3$ is then labeled.

The actual breadth-first traversal of the mesh starts by removing the front element from the queue, in this case $t_3$. The motion vector of its third node, $\vec{v}_6$, is now decoded using $\vec{v}_3$ and $\vec{v}_1$ as predictors and retrieving the prediction error from the bit stream. Node $\vec{p}_6$ is marked 'done'. The next step is to append any triangles adjacent to the current triangle $t_3$ that are not yet labeled to the triangle queue. The triangle on the right of the current triangle (in this case $t_5$) is appended first; then the triangle on the left (in this case $t_0$); both are labeled. The next iteration of the traversal commences by removing the front element from the queue, in this case $t_5$. The motion vector of its third node, $\vec{v}_7$, is now decoded using $\vec{v}_3$ and $\vec{v}_6$ as predictors and retrieving the prediction error from the bit stream. Node $\vec{p}_7$ is marked 'done' and the connected triangle $t_8$ is appended to the triangle queue and labeled. Such iterations continue until the triangle queue is empty and all node motion vectors have been decoded; the steps of the algorithm are also illustrated in Table 2.

TABLE 2

| decode | triangle queue state |
|---|---|
| $v_3, v_1$ | $\{t_3\}$ |
| $v_6$ | $\{t_5, t_0\}$ |
| $v_7$ | $\{t_0, t_8\}$ |
| $v_0$ | $\{t_8, t_2\}$ |
| $v_8$ | $\{t_2, t_9, t_6\}$ |
| $v_4$ | $\{t_9, t_6, t_1\}$ |
| $v_9$ | $\{t_6, t_1\}$ |
| — | $\{t_1, t_7\}$ |
| $v_2$ | $\{t_7, t_4\}$ |
| $v_5$ | $\{t_4\}$ |
| — | $\{\}$ |

The Bit Stream Syntax and Semantics

The following is an implementation of the invention within the current version of MPEG-4 Working Draft (WD)V 5.0. The Working Draft specifies only the decoding process. The following is an object-oriented pseudo computer code implementing the decoding process for both the mesh geometry and motion vectors according to the structure of the current specification of MPEG-4 WD V 5.0.

Mesh Object

The Mesh Object class defines the syntax for a sequence of 2D meshes.

TABLE 3

| MeshObject() { | No. of bits | Mnemonic |
|---|---|---|
| mesh_object_start_code | 32 | bslbf |
| do { | | |
|   MeshObjectPlane() | | |
| } while (nextbits_bytealigned()== | | |
| mesh_object_plane_start_code) | | |
| next_start_code() | | |
| mesh_object_end_code | 32 | bslbf |
| } | | |

Mesh Object Plane

The Mesh Object Plane class defines the syntax for coding a single 2D mesh, either as a new mesh or with respect to the previously coded mesh.

TABLE 4

| MeshObjectPlane() { | No. of bits | Mnemonic |
|---|---|---|
|   mesh_object_plane_start_code | 32 | bslbf |
|   new_mesh_flag | 1 | bsblf |
|   if (new_mesh_flag =='1') { | | |
|     MeshGeometry() | | |
|   } | | |
|   else { | | |
|     MeshMotion() | | |
|   } | | |
| } | | |

The Mesh Geometry class defines the syntax for coding the 2D geometry of a new mesh, which may either be a uniform mesh or a Delaunay triangulated mesh.

TABLE 5

| MeshGeometry() { | No. of bits | Mnemonic |
|---|---|---|
|   mesh_type_code | 2 | bslbf |
|   if (mesh_type_code == '00') { | | |
|     nr_of_mesh_nodes_hori | 10 | uimsbf |
|     nr_of_mesh_nodes_verti | 10 | uimsbf |
|     mesh_rect_size_hori | 8 | uimsbf |
|     mesh_rect_size_verti | 8 | uimsbf |
|     triangle_split_code | 2 | bslbf |
|   } | | |
|   else if (mesh_type_code =='01') { | | |
|     nr_of_mesh_nodes | 16 | uimsbf |
|     nr_of_boundary_nodes | 10 | uimsbf |
|     node0_x | 10 | uimsbf |
|     node0_y | 10 | uimsbf |
|     for (n=1; n < nr_of_mesh_nodes; n++) | | |
|   { | | |
|     delta_x_len_vlc | 2–9 | vlclbf |
|     delta_x | 0–11 | vlclbf |
|     delta_y_len_vlc | 2–9 | vlclbf |
|     delta_y | 0–11 | vlclbf |
|     } | | |
|   } | | |
| } | | |

The Mesh Motion class defines the syntax for coding the 2D motion vectors of the previous 2D mesh to the current mesh, thereby coding the current 2D mesh.

TABLE 6

| MeshMotion() { | No. of bits | Mnemonic |
|---|---|---|
|   motion_range_code | 2 | uimsbf |
|   for (n=0; n < nr_of_mesh_nodes; n++) { | | |
|     node_motion_vector_flag | 1 | sblbf |
|     if (node_motion_vector_flag == '1') { | | |
|     delta_mv_x_vlc | 1–13 | vlclbf |
|     delta_mv_x_res | 0–2 | uimsbf |
|     delta_mv_y_vlc | 1–13 | vlclbf |
|     delta_mv_y_res | 0–2 | uimsbf |
|     } | | |
|   } | | |
| } | | |

Semantics of Syntax

The mesh bit stream syntax consists of two parts: mesh geometry and mesh motion. The mesh geometry is only encoded when a new mesh needs to be initialized; it consists of the initial positions of the mesh nodes. The mesh motion is encoded at subsequent time instants to describe the motion of the dynamic mesh; it consists of a motion vector for each mesh node.

The dynamic mesh syntax allows for coding different types of 2D mesh structures, e.g., uniform or Delaunay-constrained and different magnitude ranges for the node motion vectors. The node coordinate and node motion vector accuracy is 0.5 pixel. marker_bit—This one-bit code is set to "1". Setting this bit to "1" prevents emulation of start codes.

mesh_object_start_code

This is the bit string '000001BC' in hexadecimal. It marks the start of a mesh object. This is a unique bit string of length 32 bits for the purpose of synchronization.

mesh_object_end_code

This is the bit string in hexadecimal. It marks the end of a mesh object. This is a unique code of length 32 bits for the purpose of synchronization.

mesh_object_plane_start_code

This is the bit string '000001BD' in hexadecimal. It marks the start of a mesh object plane. This is a unique code of length 32 bits for the purpose of synchronization.

new_mesh_flag

This is a one bit code specifying whether a new mesh is to be initialized or that the current mesh is encoded with respect to the previous mesh.

TABLE 7

| new_mesh_flag | mesh coding type | |
|---|---|---|
| 1 | I | (coded by geometry) |
| 0 | P | (coded by motion with respect to previous mesh) | mesh_type_code

This is a one bit code specifying the type of initial mesh geometry being encoded.

TABLE 8

| meshhd —typehd —code | mesh geometry type |
|---|---|
| 00 | uniform |
| 01 | Delaunay |
| 10 | not used (reserved) |
| 11 | not used (reserved) | nr_of_mesh_nodes_hori

This is a 10 bit code specifying the number of nodes in one row of a uniform mesh.

nr_of_mesh_nodes_verti

This is a 10 bit code specifying the number of nodes in one column of a uniform mesh.

mesh_rect_size_hori

This is a 8 bit code specifying the width of a rectangle of a uniform mesh (containing two triangles) in half pixel units.

mesh_rect_size_verti

This is a 8 bit code specifying the height of a rectangle of a uniform mesh (containing two triangles) in half pixel units.

triangle_split_code

This is a 2 bit code specifying how rectangles of a uniform mesh are split to form triangles.

TABLE 9

| triangle_split_code | type |
| --- | --- |
| 00 | split all rectangles top-left to bottom-right |
| 01 | split all rectangles bottom-left to top-right |
| 10 | split alternately top-left to bottom-right and bottom-left to top-right |
| 11 | split alternately bottom-left to top-right and top-left to bottom-right | nr_of_mesh_nodes

This is a 16 bit code defining the total number of nodes (vertices) of a (non-uniform) Delaunay mesh. These nodes include both interior nodes as well as boundary nodes.

nr_of_boundary_nodes

This is a 10 bit code defining the number of nodes (vertices) on the boundary of a (non-uniform) Delaunay mesh.

node0_x

This is a 10 bit code specifying the x-coordinate of the first boundary node (vertex) of a mesh in half-pixel units with respect to a local coordinate system.

node0_y

This is a 10 bit code specifying the y-coordinate of the first boundary node (vertex) of a mesh in half-pixel units with respect to a local coordinate system.

delta_x_len_vlc

This is a variable length code specifying the length of the delta_x code that follows. The delta_x_len_vlc and delta_x codes together specify the difference between the x-coordinates of a node (vertex) and the previously encoded node (vertex). The definition of the delta_x_len_vlc and delta_x codes are given in the MPEG-4 Video Verification Model 7.0 (VM 7.0) (N1642, section 4.7.1.1) (Apr. 1997), hereinafter MPEG-4 VVM 7.0, where they are used for sprite trajectory coding.

delta_x

This is a fixed length code defining the value of the difference between the x-coordinates of a node (vertex) and the previously encoded node (vertex). The definition of the delta_x_len_vl and delta_x codes are given in the MPEG-4 VVM 7.0, section 4.7.1.1, where they are used for sprite trajectory coding.

delta_y_len_vlc

This is a variable length code specifying the length of the delta_y code that follows. The delta_y_len_vlc and delta_y codes together specify the difference between the y-coordinates of a node (vertex) and the previously encoded node (vertex). The definition of the delta_y_len_vlc and delta_y codes are given in the MPEG-4 VVM 7.0, section 4.7.1.1, where they are used for sprite trajectory coding.

delta_y

This is a fixed length code defining the value of the difference between the y-coordinates of a node (vertex) and the previously encoded node (vertex). The definition of the delta_y_len_vlc and delta_y codes are given in the MPEG-4 VVM 7.0, section 4.7.1.1, where they are used for sprite trajectory coding.

motion_range_code

This is a 2 bit code specifying the dynamic range of motion vectors.

TABLE 10

| motion_range_code | motion vector range in half sample units |
| --- | --- |
| 1 | [−32, 31] |
| 2 | [−64, 63] |
| 3 | [−128, 127] | node_motion_vector_flag

This is a 1 bit code specifying whether a motion vector follows. If a node has a zero motion vector, then the motion vector is not encoded; instead, a node_motion_vector_flag with value "0" is sent. If this flag is set to "1", it means the node has a non-zero motion vector.

delta_mv_x_vlc

This is a variable length code defining (together with delta_mv_x_res) the value of the difference in the x-component of the motion vector of a node compared to the x-component of a predicting motion vector. The section on the decoding process describes how the predicting motion vector is found. The definition of the delta_mv_x_vlc and delta_mv_x_res codes are given in the MPEG-4 VVM 7.0, section 6.1.8 and 6.1.9, Table 30, where they are used for motion vector difference coding.

delta_mv_x_res

This is a fixed length code defining the residual in the difference of motion vectors as encoded by delta_mv_x_vlc. The definition of the delta_mv_x_vlc and delta_mv_x_res codes are given in the MPEG-4 VVM 7.0, section 6.1.8 and 6.1.9, where they are used for motion vector difference coding.

delta_mv_y_vlc

This is a variable length code defining (together with delta_mv_y_res) the value of the difference in the y-component of the motion vector of a node compared to the y-component of a predicting motion vector. The section on the decoding process describes how the predicting motion vector is found. The definition of the delta_mv_y_vlc and delta_mv_y_res codes are given in the MPEG-4 VVM 7.0 section 6.1.8 and 6.1.9, Table 30, where they are used for motion vector difference coding.

delta_mv_y_res

This is a fixed length code defining the residual in the difference of motion vectors as encoded by delta_mv_y_vlc. The definition of the delta_mv_y_vlc and delta_mv_y_res codes are given in the MPEG-4 VVM 7.0 section 6.1.8 and 6.1.9, where they are used for motion vector difference coding.

Industrial Applications

The 2D dynamic mesh representation supports the following applications:

Video Object Manipulation

In 3D computer graphics, the animation parameters of a 3D mesh model are often synthetically specified. The animation parameters of a 2D mesh model may likewise be specified synthetically, but they may also be derived from a natural video sequence by motion estimation. Thus, mesh modeling allows us to interactively combine natural and synthetic objects within a unified framework. Possible applications include object transfiguration (replacing one object by another object in moving video), augmented reality (augmenting/overlaying an object in moving video with graphics or text) and spatio/temporal image interpolation (zooming or frame-rate conversion)

Video Compression

Motion estimation and compensation have proven to be important tools for video coding systems to obtain high compression ratios. The properties of the mesh-based motion model make it a suitable alternative to block-based motion modeling for use as a motion compensation tool in video coding in which case the motion vectors of mesh nodes are transmitted instead of block-motion vectors. Mesh-based video compression may for instance be performed by transmitting texture maps only at selected key frames and by animating these texture maps (without sending any prediction error image) for the intermediate frames using 2D mesh information. Only the image data of the first frame of a sequence is encoded, as well as the mesh motion data corresponding to all frames of the sequence. In case the initial mesh is adapted to image content, information about the initial mesh geometry has to be encoded and transmitted as well. In the case of video coding, the initial mesh geometry is sometimes restricted to limit the overhead involved (e.g., uniform meshes); however, more general mesh geometry compression schemes may be applied in case of multimedia coding, where several objects (video, audio, text, 2D/3D meshes etc.) are encoded independently.

Indexing and Browsing for Video Libraries

Content-based random access to individual video objects becomes a desirable feature in several distributed multimedia applications, such as object-based browsing/editing/manipulation of video databases. Useful motion and shape features may be derived from the 2D content-based triangular mesh representation of video which may be employed in such applications.

Thus, a system and method for a 2-D mesh geometry and motion vector compression have been disclosed. Although a preferred embodiment of the method of the invention, and several variations thereof, have been disclosed, it should be appreciated that further variations and modifications may be made thereto without departing from the scope of the invention as defined in the appended claims.

We claim:

1. A method of encoding and decoding a dynamic mesh having a temporal sequence of mesh models, comprising:
    encoding and decoding a first mesh model in the temporal sequence of the dynamic mesh, by encoding and decoding the geometry of a set of mesh node points in the first mesh model; and
    encoding and decoding subsequent mesh models in the temporal sequence of the dynamic mesh, by encoding and decoding the deformable motion of each mesh model, represented by a mesh node motion vector for each node point.

2. The method of claim 1 wherein said encoding and decoding of a mesh geometry includes compressing a mesh topology of a Delaunay type.

3. The method of claim 1 wherein said encoding and decoding of a mesh geometry includes compressing a mesh topology of a uniform type.

4. The method of claim 1 wherein said encoding and decoding of the deformable motion of a mesh model includes:
    compressing the motion vectors for each node point using a linear traversal of the node points that is independent of a triangular mesh topology; and
    predicting, using at least first order prediction, subsequent motion vectors for each node point.

5. The method of claim 4 wherein said predicting includes encoding and decoding prediction errors using variable length codes.

6. The method of claim 4 which includes traversing and ordering the mesh node points for a Delaunay type mesh.

7. The method of claim 4 which includes traversing and ordering the mesh node points for a uniform type mesh.

8. The method of claim 1 wherein said encoding and decoding of the deformable motion of a mesh model includes:
    compressing the motion vectors for each node point using a breadth-first traversal of the mesh triangles;
    deriving a unique ordering of the node points; and
    predicting, using at least second order prediction, subsequent motion vectors for each node point.

9. The method of claim 8 wherein said predicting includes encoding and decoding prediction errors using variable length codes.

10. A method of encoding and decoding a dynamic mesh having a temporal sequence of mesh models and a set of polygonal patches therein, comprising:
    encoding and decoding a first mesh model in the temporal sequence of the dynamic mesh, by encoding and decoding the geometry of a set of mesh vertices in the first mesh model; and
    encoding and decoding subsequent mesh models in the temporal sequence of the dynamic mesh, by encoding and decoding the deformable motion of each mesh model, represented by a mesh node motion vector for each vertex.

11. The method of claim 10 wherein said encoding and decoding of a mesh geometry includes compressing a mesh topology of a Delaunay type.

12. The method of claim 10 wherein said encoding and decoding of a mesh geometry includes compressing a mesh topology of a uniform type.

13. The method of claim 10 wherein the polygons are triangles and said encoding and decoding of the deformable motion of a mesh model includes:
    compressing the motion vectors for each vertex using a linear traversal of the vertices that is independent of a triangular mesh topology; and
    predicting, using at least first order prediction, subsequent motion vectors for each vertex.

14. The method of claim 13 wherein said predicting includes encoding and decoding prediction errors using variable length codes.

15. The method of claim 13 which includes traversing and ordering the mesh vertices for a Delaunay type wash.

16. The method of claim 13 which includes traversing and ordering the mesh vertices for a uniform type mesh.

17. The method of claim 10 wherein said encoding and decoding of the deformable motion of a mesh model includes:
    defining triangles throughout the mesh;
    compressing the motion vectors for each vertex using a breadth-first traversal of the triangles and the vertices of the triangles;

deriving a unique order of the node points; and predicting, using at least second order prediction, subsequent motion vectors for each vertex.

18. The method of claim 17 wherein said predicting includes encoding and decoding prediction errors using variable length codes.

19. A system for encoding and decoding an animated image represented by a dynamic mesh, wherein the dynamic mesh has a temporal sequence of mesh models in a fixed topology, each having a set of node points and motion vectors for the node points; comprising:

an encoder subsystem for encoding the mesh models of the dynamic mesh and an image texture including:
a texture encoder for encoding the texture of an image and for producing an image bitstream therefrom;
a mesh encoder for encoding a mesh sequence; said mesh encoder including a geometry encoder for encoding the geometry of the mesh, and a mesh motion encoder for encoding the motion vectors of the mesh; and for generating a mesh coded bitstream therefrom;

a decoder subsystem for decoding the mesh models of the dynamic mesh and an image texture, including:
a texture decoder for decoding the texture of an image from an image bitstream;
a mesh decoder for decoding said mesh encoded bitstream, including a geometry decoder for decoding the geometry of the mesh, and a mesh motion decoder for decoding the motion vectors of the mesh; and an animation application for combining the decoded texture data and the decoded mesh, and for generating an animated image therefrom.

* * * * *